US010570844B2

(12) United States Patent
Rollinger et al.

(10) Patent No.: US 10,570,844 B2
(45) Date of Patent: Feb. 25, 2020

(54) AIR/FUEL IMBALANCE MONITOR

(75) Inventors: John Eric Rollinger, Sterling Heights, MI (US); Michael Igor Kluzner, Oak Park, MI (US); Robert Roy Jentz, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1173 days.

(21) Appl. No.: 13/353,240

(22) Filed: Jan. 18, 2012

(65) Prior Publication Data

US 2013/0184969 A1 Jul. 18, 2013

(51) Int. Cl.
*F02D 41/22* (2006.01)
*F02D 41/14* (2006.01)
*F02D 41/24* (2006.01)
*G01M 15/00* (2006.01)
*F02D 41/00* (2006.01)
*G01M 15/05* (2006.01)

(52) U.S. Cl.
CPC ......... *F02D 41/22* (2013.01); *F02D 41/1475* (2013.01); *F02D 41/2458* (2013.01); *F02D 41/0085* (2013.01); *F02D 41/1408* (2013.01); *F02D 2041/001* (2013.01); *G01M 15/00* (2013.01); *G01M 15/05* (2013.01); *Y02T 10/40* (2013.01)

(58) Field of Classification Search
CPC . G01M 15/00; G01M 15/05; F02D 2041/001; F02D 41/0085; F02D 41/22; F02D 41/1408; F02D 41/1475; F02D 41/2458; Y02T 10/40
USPC ........................................ 701/103, 110, 111
See application file for complete search history.

(56) References Cited

U.S. PATENT DOCUMENTS

| 4,703,735 | A | * | 11/1987 | Minamitani ........ F02D 41/1484 123/692 |
| 4,864,995 | A | * | 9/1989 | Kanno .................... F02D 41/34 123/406.52 |
| 4,984,551 | A | * | 1/1991 | Moser ................. F02D 41/1443 123/692 |
| 5,255,661 | A | * | 10/1993 | Nankee, II ............ F02D 33/006 123/672 |
| 5,559,704 | A | * | 9/1996 | Vanek et al. .................... 701/99 |
| 5,758,607 | A | * | 6/1998 | Brendel et al. .............. 123/41.1 |
| 5,774,823 | A | | 6/1998 | James et al. |
| 5,915,359 | A | * | 6/1999 | Meyer et al. ................. 123/436 |
| 6,016,796 | A | | 1/2000 | Dalton |

(Continued)

FOREIGN PATENT DOCUMENTS

| DE | 102007043734 | * | 3/2009 |
| JP | 11030132 A | * | 2/1999 |
| JP | 11030132 A | * | 2/1999 |

OTHER PUBLICATIONS

Jentz, Robert et al., "Fuel Identification Based on Crankshaft Acceleration" U.S. Appl. No. 13/353,255, 35 pgs.

Primary Examiner — Mahmoud Gimie
Assistant Examiner — Joshua Campbell
(74) Attorney, Agent, or Firm — Geoffrey Brumbaugh; McCoy Russell LLP

(57) ABSTRACT

Systems and methods for monitoring cylinder air/fuel imbalances are provided. In one example approach, a method comprises, identifying a cylinder with a potential air/fuel imbalance based on crankshaft accelerations generated by a series of rich, lean, and stoichiometric conditions in the cylinder while keeping the engine at stoichiometry.

23 Claims, 8 Drawing Sheets

(56) References Cited

U.S. PATENT DOCUMENTS

| | | | |
|---|---|---|---|
| 6,112,149 A | 8/2000 | Varady et al. | |
| 6,148,808 A * | 11/2000 | Kainz | 123/673 |
| 6,668,812 B2 * | 12/2003 | Javaherian | F02D 41/0085 |
| | | | 123/406.24 |
| 6,799,421 B2 * | 10/2004 | Surnilla | 60/285 |
| 6,975,933 B2 | 12/2005 | Abe et al. | |
| 7,523,744 B2 | 4/2009 | Ayame | |
| 2008/0046155 A1 * | 2/2008 | Holthaus et al. | 701/51 |
| 2008/0060427 A1 | 3/2008 | Hoshi et al. | |
| 2009/0031706 A1 * | 2/2009 | Miyashita | 60/285 |
| 2009/0229897 A1 * | 9/2009 | Yutani et al. | 180/65.28 |
| 2009/0314071 A1 | 12/2009 | Mukai | |
| 2010/0017098 A1 | 1/2010 | Fukuchi et al. | |
| 2010/0138135 A1 * | 6/2010 | Hacker et al. | 701/102 |
| 2010/0218485 A1 * | 9/2010 | Fujiwara et al. | 60/276 |
| 2011/0100327 A1 * | 5/2011 | Nakagawa | F02D 13/0226 |
| | | | 123/445 |
| 2011/0191006 A1 * | 8/2011 | Nishida | F02D 41/0025 |
| | | | 701/103 |

\* cited by examiner

AIR/FUEL IMBALANCE MONITOR

IMBALANCE MONITOR BACKGROUND AND SUMMARY

Cylinder to cylinder variations in combustion associated with air/fuel ratio imbalances may occur in engines due to various factors. For example, cylinder-to-cylinder air/fuel ratio imbalances may occur due to cylinder-to-cylinder variation in intake valve depositions, plugged EGR orifices, electrical faults, air leaks, and/or shifted fuel injectors, etc.

In some approaches, air/fuel imbalances may be monitored using a proportional oxygen sensor (e.g., UEGO) to calculate an amount of imbalance by determining a high frequency component of the sensor signal related to cylinder-to-cylinder deviation. In such an approach, cylinder air/fuel imbalance may be estimated by accumulating the amount of cylinder-to-cylinder deviations per calibratable RPM window, for example.

However, the inventors herein have recognized that such approaches may not provide individual cylinder capability and may not differentiate air mass delivery route faults from fuel pass delivery faults thereby leading to errors in individual cylinder imbalance detection. Further still, in such approaches, sensor contamination and aging may diminish monitor capability over time by lessening sensor frequency response.

In other approaches, cylinder air/fuel imbalances may be monitored using crankshaft acceleration signal processing to detect cylinder-to-cylinder variations in combustion associated with air/fuel imbalances. However, such approaches may erroneously identify air/fuel imbalances since fluctuations in crankshaft acceleration may be due to so many other factors, e.g., spark plug fouling, ignition coil malfunction, etc.

In one example approach, in order to at least partially address these issues, a method for monitoring cylinder air/fuel imbalances is provided. The method comprises, identifying a cylinder with a potential air/fuel imbalance based on crankshaft accelerations generated by a applying a predetermined pattern of rich, lean, and stoichiometric conditions in the cylinder while keeping an overall exhaust mixture at stoichiometry. For example, the predetermined pattern of rich, lean, and stoichiometric conditions in the cylinder may be selected so that lean combustions are compensated by rich combustions in other cylinders leading to a common exhaust passage.

In this way, emission and driveability impact together with noticeable RPM disturbances during imbalance monitoring may be reduced since the exhaust is kept at stoichiometry during the monitoring. Further, air/fuel causality of maldistribution may be identified on a cylinder to cylinder basis to identify the sign or direction (e.g., rich/lean) of the imbalance along with an amount of correction to mitigate the emissions effects of an individual cylinder imbalance. Such an approach is made possible at least in part due to the pre-selection of the applied pattern. The a priori knowledge thus enables the system to compensate for air and/or fuel path errors.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
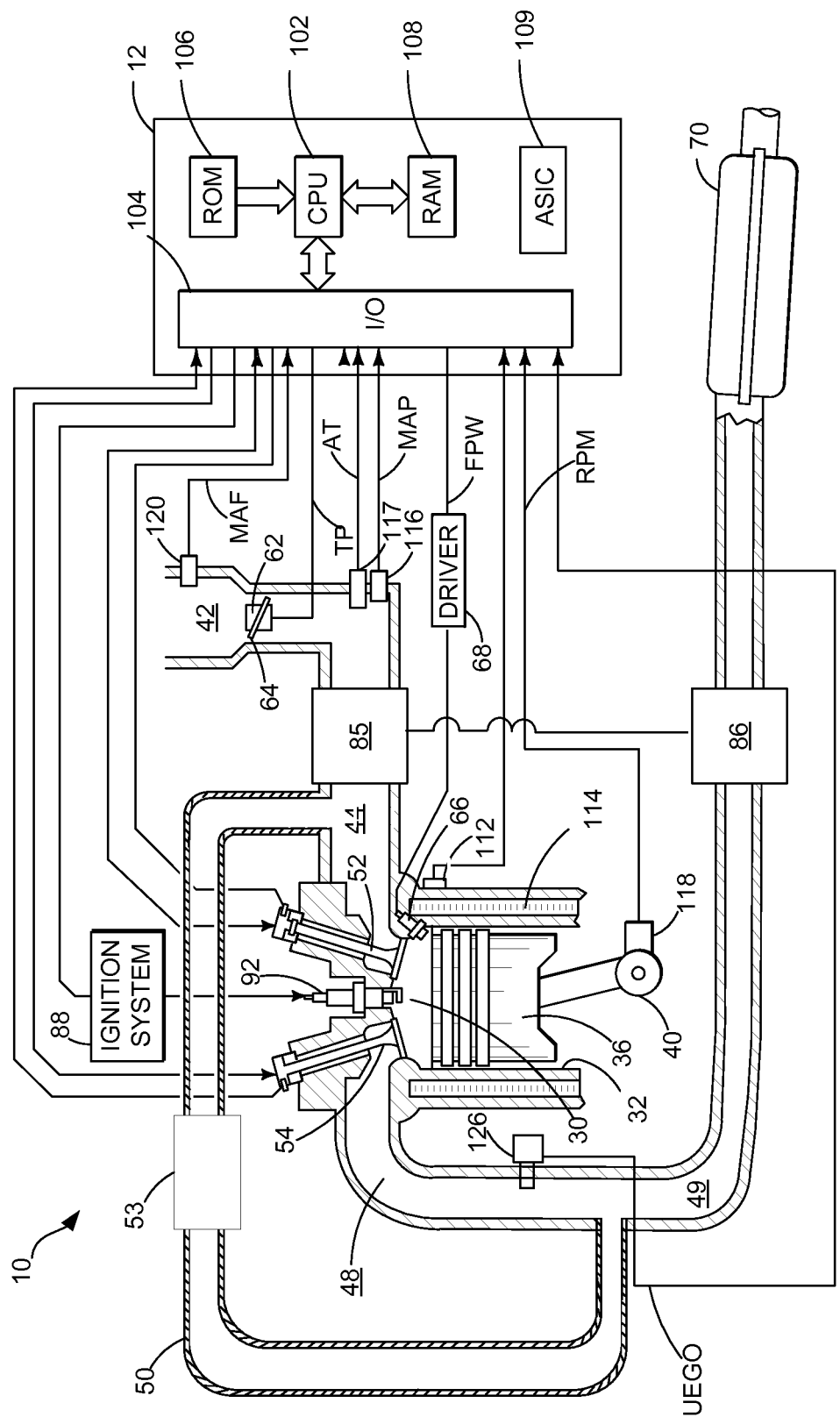
FIG. 1 shows a schematic diagram of an example engine in accordance with the disclosure.

The present disclosure is directed to monitoring cylinder air/fuel ratio imbalances which may occur in engines, such as the example engine shown in FIG. 1, due to various factors such as cylinder-to-cylinder variation in intake valve depositions, plugged EGR orifices, electrical faults, air leaks, and/or shifted fuel injectors, etc.

FIG. 1 shows a schematic diagram of an example internal combustion engine 10 in which the disclosed systems and methods may be implemented. Engine 10 may be a diesel engine in one example and a gasoline engine in another example.

Engine 10 may comprise one or more engine cylinder banks (not shown), each of which may include a plurality of engine cylinders, only one cylinder of which is shown in FIG. 1. Engine 10 may include combustion chamber 30 and cylinder walls 32 with piston 36 positioned therein and connected to crankshaft 40. Combustion chamber 30 may communicate with intake manifold 44 and exhaust manifold 48 via respective intake valve 52 and exhaust valve 54. Engine 10 may be controlled by electronic engine controller 12.

Engine 10 is shown as a direct injection engine with injector 66 located to inject fuel directly into cylinder 30. Fuel is delivered to fuel injector 66 by a fuel system (not shown), including a fuel tank, fuel pump, and/or high pressure common rail system. Fuel injector 66 delivers fuel in proportion to the pulse width of signal FPW from controller 12. Both fuel quantity, controlled by signal FPW and injection timing may be adjustable. Engine 10 may utilize compression ignition combustion under some conditions, for example. Engine 10 may utilize spark ignition using a spark plug 92 of an ignition system, or a combination of compression ignition and spark ignition.

Combustion chamber 30 may receive intake air from intake manifold 44 via intake passage 42 and exhaust combustion gases via exhaust manifold 48 and exhaust passage 49. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

One or more exhaust gas sensors may be provided in exhaust manifold 48 and/or exhaust passage 49 for sensing contents of engine exhaust gas. The exhaust gas sensors may be any suitable sensor for providing an indication of exhaust gas air/fuel ratio, such as $O_2$, NOx, HC, or CO sensor. As shown in FIG. 1, a universal oxygen sensor (UEGO) 126 is provided for exhaust manifold 48.

An exhaust gas recirculation (EGR) system for recirculating exhaust air back into intake may be provided. The EGR system may include an EGR passage 50 formed from the exhaust passage 49 to the intake passage 42, and an EGR valve 53 positioned in the EGR passage 50 for regulating the EGR flow.

Emission control device 70 is shown arranged along exhaust passage 49 downstream of exhaust gas sensor 126. Device 70 may be a three way catalyst (TWC), NOx trap, various other emission control devices, or combinations thereof.

A turbocharger can be coupled to engine 10 via the intake and exhaust manifolds. The turbocharger may include a compressor 85 in the intake and a turbine 86 in the exhaust coupled via a shaft. A throttle 62 including a throttle plate 164 may be provided along an intake passage of the engine for varying the flow rate and/or pressure of intake air provided to the engine cylinders.

Controller 12 is shown in FIG. 1 as a microcomputer including: microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold pressure (MAP) from pressure sensor 116 coupled to intake manifold 44; a measurement (AT) of manifold temperature from temperature sensor 117; an engine speed signal (RPM) from engine speed sensor 118 coupled to crankshaft 40. Controller 12 may also include an application specific integrated circuit (ASIC) 109 for implementing some of the actions in the methods described herein.

As will be appreciated by one skilled in the art, the specific routines described below in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages, but is provided for ease of illustration and description. Although not explicitly illustrated, one or more of the illustrated acts or functions may be repeatedly performed depending on the particular strategy being used. Further, these figures may graphically represent code to be programmed into the computer readable storage medium in controller 12.

Figure 2:
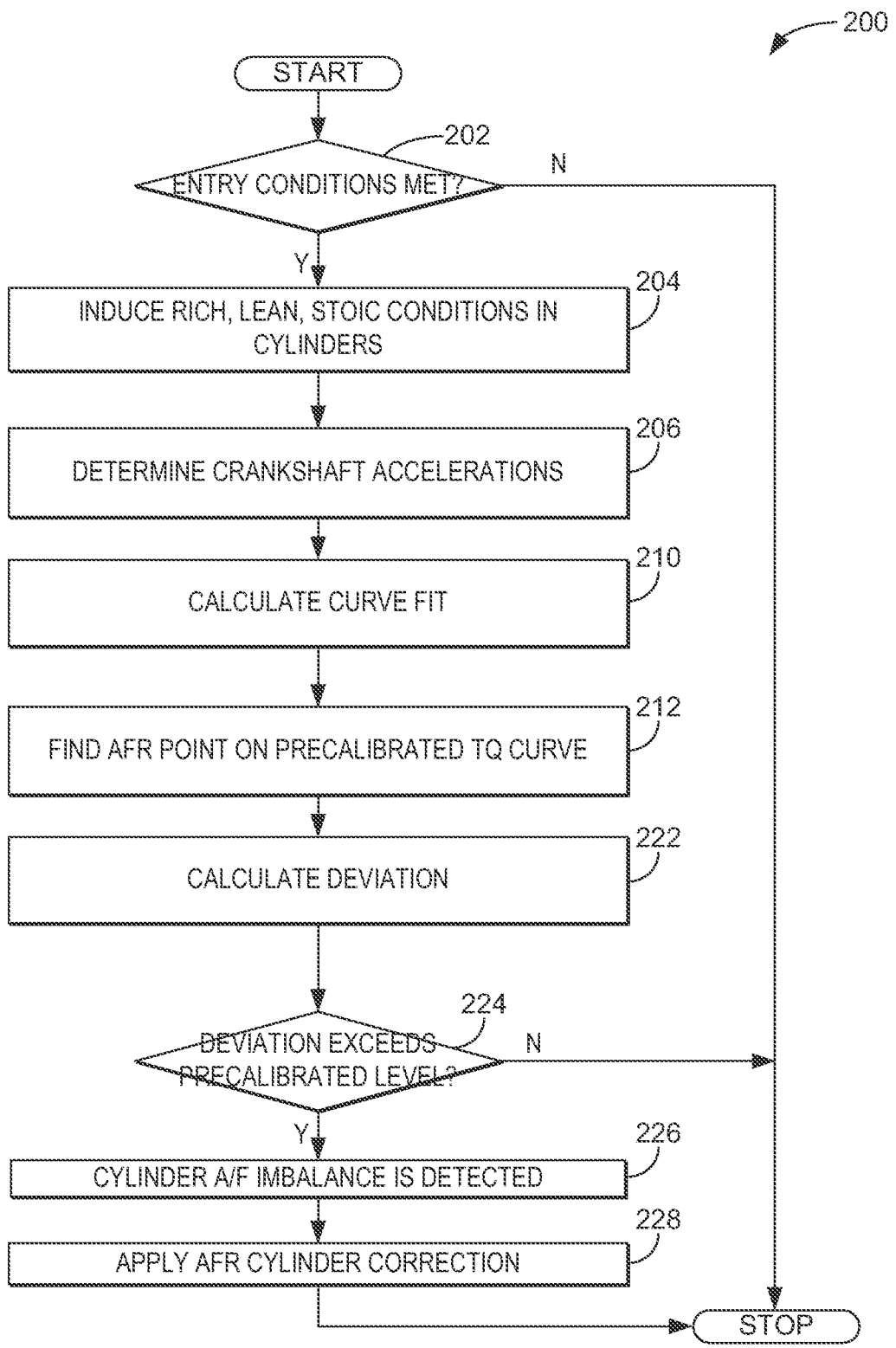
FIG. 2 shows an example method for monitoring cylinder air/fuel imbalances in accordance with the disclosure.

FIG. 2 shows an example method 200 for monitoring cylinder air/fuel imbalances. As described in more detail below, a series of rich, lean, and stoichiometric conditions in the cylinders of an engine may be used to generate crankshaft accelerations while keeping the engine substantially at stoichiometry.

The series of rich, lean, and stoichiometric conditions generated in a cylinder may in turn generate crankshaft accelerations (e.g., torque changes) corresponding to each rich, lean, or stoichiometric condition in each cylinder. A potential air/fuel imbalance in a cylinder may then be identified based on a slope or shape of a mapping of the crankshaft accelerations versus air/fuel ratios corresponding to the series of rich, lean, and stoichiometric conditions in that cylinder.

Figure 5:
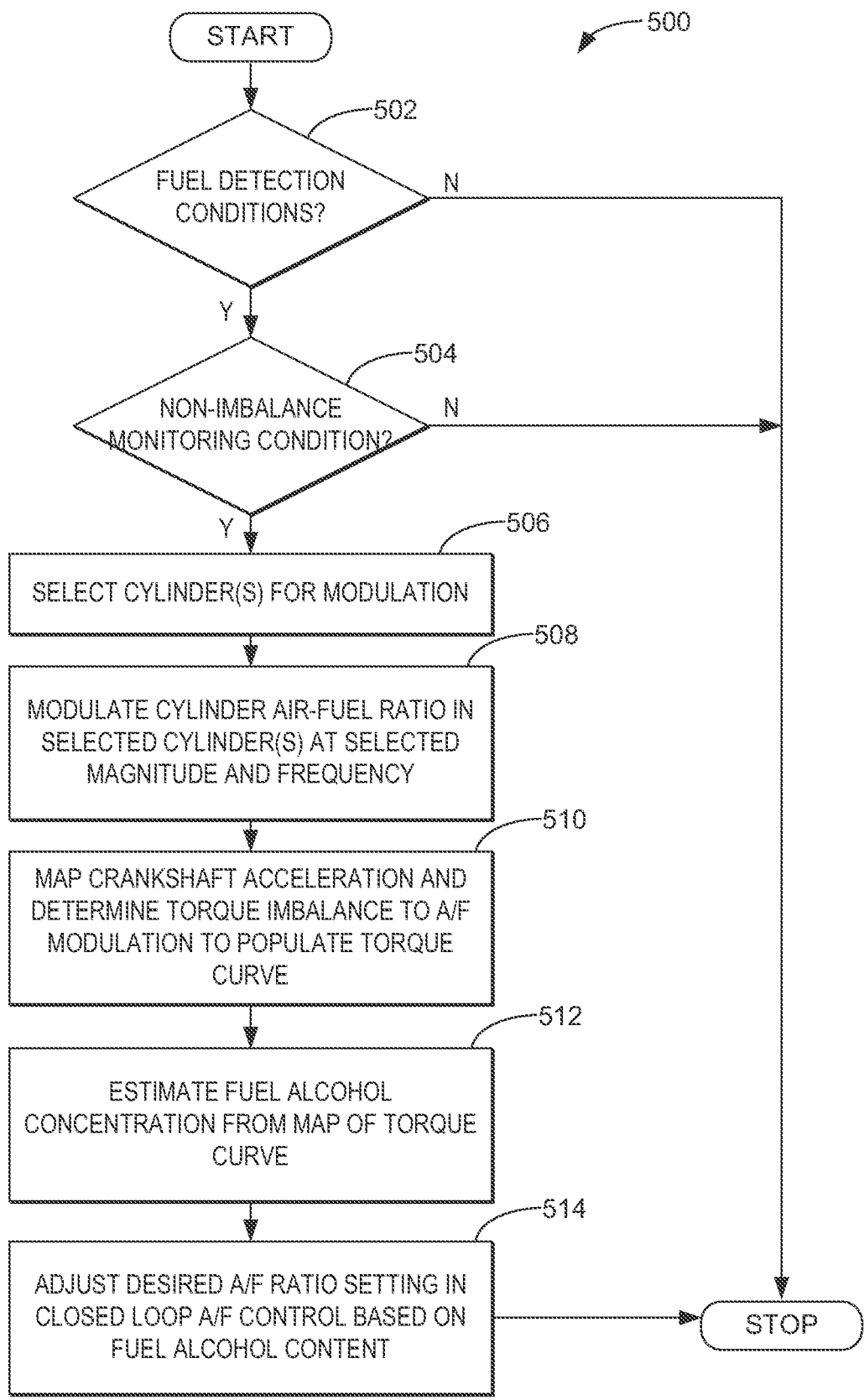
FIG. 5 shows an example method for detecting fuel conditions based on crankshaft acceleration and adjusting fuel injection to the engine accordingly.

In some examples, under certain conditions, one or more actions of method 200 may be performed in concert with one or more actions from method 500 described below with reference to FIG. 5. In particular, method 200 includes using crankshaft accelerations to assist in monitoring cylinder air/fuel imbalances and method 500 includes using crankshaft accelerations to estimate fuel alcohol content.

At 202, method 200 includes determining if entry conditions are met. Various entry conditions for starting the air/fuel monitor may be checked in 202. For example, entry conditions may include background sample rate (e.g., time-based sampling) entry conditions and/or foreground sample rate (e.g., crank-angle domain based sampling) entry conditions. For example, entry conditions may depend on global conditions such as an engine temperature (engine has to be warmed up to run the test), ambient temperature, lack of transient disturbances or speed and load requirements. In some examples, entry conditions may depend on local conditions such as an amount of purge, an amount of transient fuel which can be tolerated by the monitoring routine, closed loop compensations such as idle rpm deviations, fuel closed loop requirements, and spark or air close loop compensations, for example.

As another example, entry conditions may be engine rotation speed dependent and/or may be based on various parameters to reduce transient air/fuel effects, or various other conditions. For example, air/fuel imbalance monitoring may be implemented during low load engine operating conditions or may be scheduled to be performed at specific times or intervals, e.g., after a certain number of miles have been driven, etc. In some examples, if entry conditions are not met at 202, an air/fuel imbalance monitoring routine may be disabled and rescheduled for a later time, e.g., after a certain number of miles have been driven, after a certain period of time has passed, after a next engine start, etc.

If entry conditions are met at 202, method 200 proceeds to 204. At 204, method 200 includes generating or inducing a series of rich, lean, and/or stoichiometric conditions in the cylinders of the engine. In some examples, the series of rich, lean, and stoichiometric conditions may be induced in the cylinders of the engine based on predetermined patterns, as described below with regard to FIG. 3. However, in some examples, rather than being induced in the cylinders, the series of rich, lean, and stoichiometric conditions in a cylinder may be random air/fuel variations in the cylinders. For example, random air/fuel variations which occur in the cylinders during normal engine operation may generate small crankshaft accelerations which may be used to monitor individual cylinders for air/fuel imbalances as described below.

The rich, lean, and stoichiometric conditions induced in the cylinders may depend on a firing order of the cylinders in the engine so that the lean, rich, or stoichiometric conditions in cylinders compensate for each other to keep the engine and/or cylinder banks of the engine substantially at stoichiometry.

These induced lean, rich, and stoichiometric conditions may be chosen so as to maintain the cylinder banks of the engine at stoichiometry while varying the air/fuel ratios in the individual cylinders to generate crankshaft accelerations.

Further, the induced lean, rich, and stoichiometric conditions may be randomized so that a rich condition in a cylinder on a first bank of the engine is not followed by a rich condition in a cylinder in a second bank of the engine for at least two sequential firings in the engine.

The series of rich, lean, and stoichiometric conditions in the cylinders modulate the air/fuel ratios in the cylinders across a range of air/fuel ratios which in turn generate crankshaft accelerations. The air/fuel ratio in a selected cylinder may be modulated near stoichiometry to induce small torque variations in the selected cylinder. As described in more detail below, the torque variations may be monitored and used to identify a sign (e.g., rich or lean) of air/fuel ratio imbalances and may assist in detecting air/fuel causality of maldistribution along with an amount of correction to mitigate emission effects of individual cylinder imbalances.

The crankshaft accelerations resulting from the air/fuel perturbations may be monitored and processed by controller 12, for example. In some examples, as described below with regard to FIG. 5, crankshaft accelerations may also be used to estimate fuel alcohol content in addition to monitoring air/fuel imbalances.

Continuing with FIG. 2, at 206, method 200 includes determining crankshaft accelerations associated with the series of rich, lean, and stoichiometric conditions generated in the cylinder at 204. The crankshaft accelerations may be estimated during the power stroke of a firing cylinder.

In some examples, determining crankshaft accelerations may include calculating normalized torque accelerations for each crankshaft acceleration generated by each lean, rich, or stoichiometric condition induced in a cylinder. The crankshaft acceleration may be normalized in a variety of ways. For example, estimated crankshaft acceleration may normalized by a value of indicated torque minus an accessory load. As another example, crankshaft acceleration may be normalized by a value of deviation between spark timing and spark advance.

Figure 4:
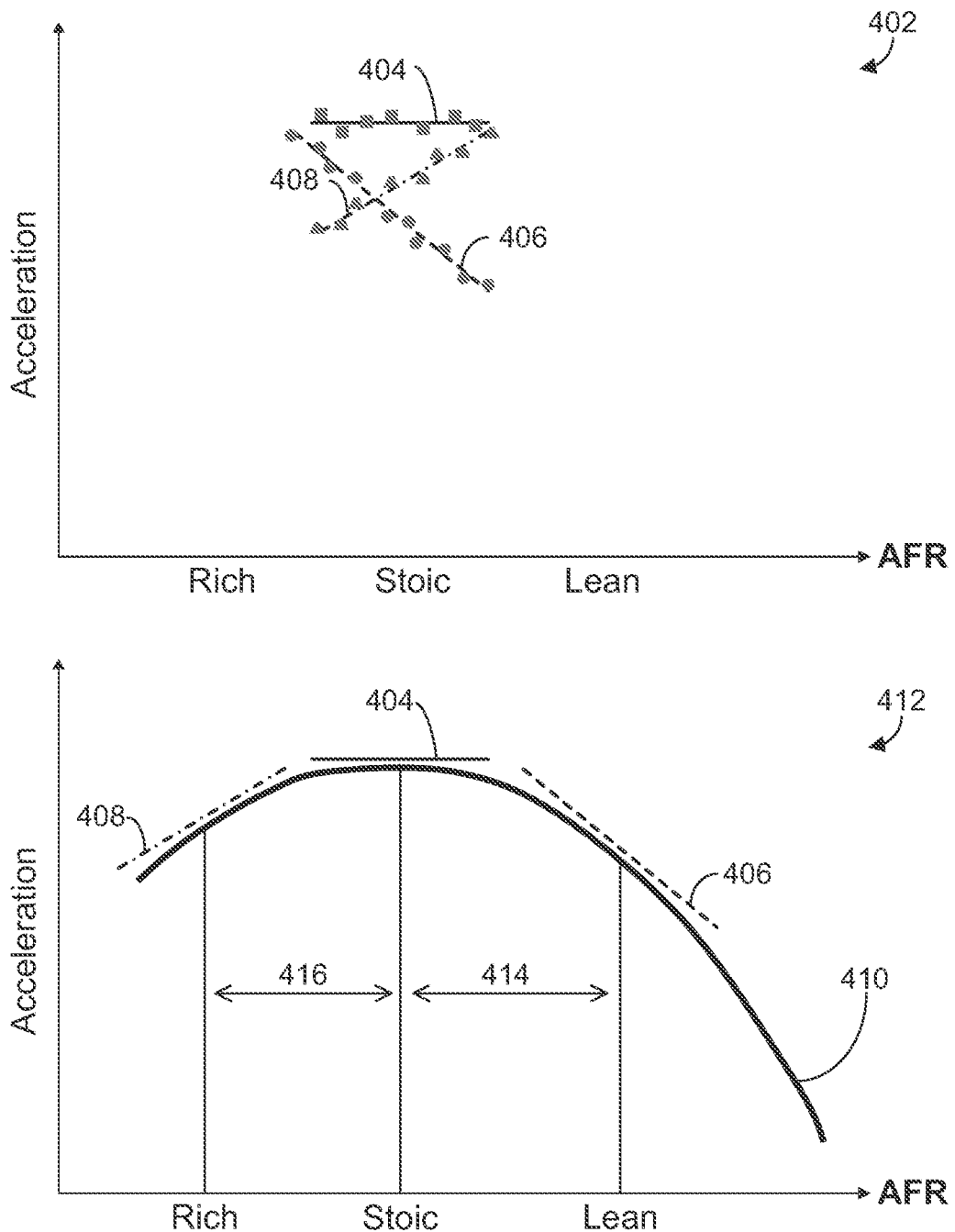
FIG. 4 shows example mappings of the crankshaft accelerations versus air/fuel ratios corresponding to series of rich, lean, and stoichiometric conditions.

The normalized acceleration values and correlated air/fuel ratio values for every cylinder and for every lean, rich, and stoichiometric condition induced in the cylinders may be stored in a memory component of controller 12 for further processing as described below. For example, the normalized torque accelerations may be used to populate a mapping of the crankshaft accelerations versus air/fuel ratios corresponding to the series of rich, lean, and stoichiometric conditions induced in a selected cylinder as shown in FIG. 4 described below.

At 210, method 200 includes, for each cylinder, calculating a curve fit to the acceleration versus corresponding lean, rich, and stoichiometric condition induced in the cylinder. In some examples, a quadratic curve fit or any other suitable curve fitting approach may be used. Example curve fits to acceleration versus air/fuel ratio data are shown in FIG. 4 described below.

At 212, based on the curve fit to the acceleration versus corresponding lean, rich, and stoichiometric condition induced in the cylinder, method 200 includes finding an air/fuel ratio point on a precalibrated torque curve (e.g., an ideal torque curve) which corresponds to the curve fit. The precalibrated torque curve may be a precalibrated curve of crankshaft accelerations versus cylinder air/fuel ratios and may be stored in a memory component in controller 12 in a look-up table, for example.

The air/fuel ratio point on the ideal torque curve corresponding to a curve fit for a cylinder may be found in a variety of ways. For example, matching algorithms may be employed to find a region of the ideal torque curve on which the curve fit matches. Example matching algorithms may include an area ratio approach which is used to minimize an area difference between the idea torque curve and the curve fit generated by the series of lean, rich, and stoichiometric conditions in a cylinder. As another example, a midpoint curve deviation approach may be employed to find an air/fuel ratio point on an ideal curve corresponding to the curve fit. As still another example, a slope of the curve fit may be used to find a point on the ideal torque curve with a substantially matching slope.

At 222, method 200 includes calculating an air/fuel ratio deviation based on the air/fuel ratio identified on the ideal curve corresponding to the curve fit. For example, when matched with the ideal torque curve, a curve fit for a cylinder may be shifted in a rich or lean direction indicating a rich or lean imbalance in the cylinder so that the amount of air/fuel shift corresponds to the magnitude of air/fuel deviation.

The air/fuel deviation may be used to determine a correction factor corresponding to an amount and direction of the shift in air/fuel ratio from the stoichiometric point for the curve fit to the air/fuel ratio point at the match point on the ideal torque curve. As described below, the correction factor may be used to determine an amount and sign of fuel correction to apply to a cylinder to correct an imbalance.

At 224, method 200 includes determining if the deviation exceeds a precalibrated level. For example, a threshold amount of air/fuel ratio deviation may be stored in a memory component of controller 12. The precalibrated level may correspond to an acceptable amount of air/fuel deviation which occurs in a cylinder. If the deviation exceeds the precalibrated level at 224, method 200 proceeds to 226.

At 226, method 200 includes indicating that a cylinder imbalance is detected. For example, individual cylinders with torque fluctuations outside a threshold range may be identified as potential cylinders with air/fuel imbalances. In particular, the crankshaft accelerations in a cylinder may generate torque fluctuations from which a potential air/fuel imbalance in the cylinder may be identified. For example, if torque fluctuations in a cylinder fall outside a predetermined threshold range then that cylinder may be identified as a potential cylinder with an air/fuel imbalance. Once an air/fuel imbalance has been confirmed, a suitable indication of degradation of the confirmed cylinder may be performed and/or fueling corrections may be applied to the confirmed cylinder in an attempt to correct the air/fuel imbalance as described below.

At 228, method 200 includes applying an air/fuel ratio correction to one or more cylinders which have been indicated as imbalanced. For example, an air/fuel correction may be applied to an identified cylinder based on the identified magnitude and direction of air/fuel imbalance in the identified cylinder. For example, controller 12 may adjust the amount of fuel supplied to cylinders which have been identified as potentially imbalanced. Controller 12 may then continue to monitor air/fuel imbalances in an attempt to correct the air/fuel imbalance in the identified cylinders. In some examples, this fuel correction to identified cylinders may be performed before confirming an imbalance in an identified cylinder.

Blocks 204-218 may be repeated in some examples. For example, if an air/fuel ratio correction was applied efficiently then the air/fuel ratio shift may be compensated. However, if an imbalance persists in a cylinder, the fault may not be fuel related and a flag may be set to indicate a non-fuel related degradation of the identified cylinder if an imbalance is identified in the cylinder after applying the air/fuel correction. Further, an indication may be sent to an on-board diagnostic system indicating the cylinder imbalance so that maintenance may be performed, for example.

Figure 3:
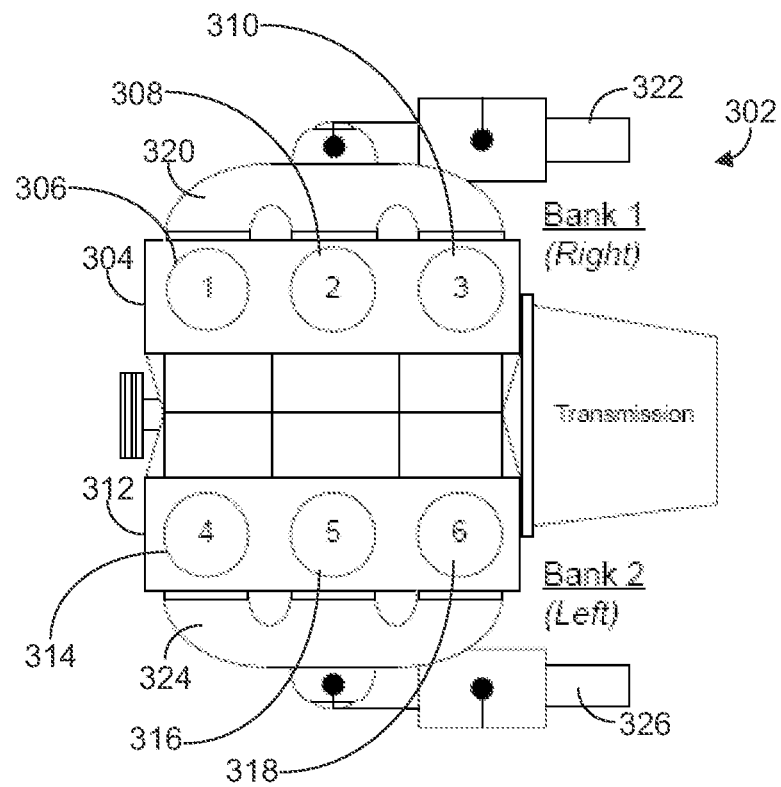
FIG. 3 shows an example series of rich, lean, and stoichiometric conditions used to induce torque accelerations in engine cylinders.

FIG. 3 shows an example series of rich, lean, and stoichiometric conditions used to induce torque accelerations in engine cylinders of an example V-6 engine 302. Engine 302 includes a first bank 304 (Bank 1) of cylinders including cylinder 306 (cylinder 1), cylinder 308 (cylinder 2), and cylinder 310 (cylinder 3). Engine 302 also includes a second bank 312 (Bank 2) of cylinders including cylinder 314 (cylinder 4), cylinder 316 (cylinder 5), and cylinder 318 (cylinder 6). Intake manifold 320 and exhaust manifold 322 are coupled to the cylinders in bank 304. Intake manifold 324 and exhaust manifold 326 are coupled to the cylinders in bank 312.

Example patterns used to generate a series of rich, lean, and stoichiometric conditions in the engine cylinders are shown in table 328. In table 328, three example sets of patterns are shown in three columns where column 330 shows a first pattern set, column 332 shows a second pattern set, and column 334 shows a third pattern set. Each entry in a column is a fuel mass multiplier which may be applied to stoichiometry (lambda=1). For example, in column 330, multiplier 0.88 is applied to cylinder 1 when cylinder 1 fires, multiplier 1.07 is applied to cylinder 2 when cylinder 2 fires, 1.07 is applied to cylinder 3 when cylinder 3 fires, etc.

These multipliers are chosen so that each bank of the engine remains at stoichiometry on average when applied to the cylinders in a specified firing order. Columns 332 and 334 show other example patterns which include the same multipliers as in column 330 but with different values for different cylinders which still maintain the engine at stoichiometry when applied.

Table 336 in FIG. 3 shows an example of how the pattern set in column 330 may be applied to the cylinders of the V-6 engine 302 so that the engine is kept substantially at stoichiometry during the air/fuel variations. In this example, the firing order of the cylinders is 1-4-2-5-3-6 and the patterns in column 330 in table 328 are applied to the cylinder based on the firing order during an engine cycle. For example, a fuel mass multiplier of 0.88 (a rich condition) is induced in cylinder 1 during firing, a fuel mass multiplier of 1.16 (a lean condition) is then induced in cylinder 4 during firing, a fuel mass multiplier of 1.07 (a lean condition) is then induced in cylinder 2 during firing, a fuel mass multiplier of 0.94 (a rich condition) is then induced in cylinder 5 during firing, a fuel mass multiplier of 1.07 (a lean condition) is then induced in cylinder 3 during firing, and finally a fuel mass multiplier of 0.94 (a rich condition) is then induced in cylinder 6 during firing.

For each rich, lean, and stoichiometric condition generated in a cylinder, for example as described in FIG. 3, torque accelerations corresponding to each induced condition may be monitored and stored in a mapping such as shown in FIG. 4 at map 402.

Map 402 in FIG. 4 shows three example possibilities resulting from applying a series of rich, lean, and stoichiometric conditions in a cylinder. The series of rich, lean, and stoichiometric conditions induced in a cylinder modulate the air/fuel ratio in the cylinder across a range of air/fuel ratios near stoichiometry. For example, as shown in FIG. 3, the air fuel ratios in cylinder 1 may be cycled through 0.88, 1.07, and 1.07 corresponding to the first row of table 328. Further, many different series of rich, lean, and stoichiometric conditions may be induced in a given cylinder over many engine cycles in order to get crankshaft acceleration versus air/fuel ratio data for the given cylinder. The crankshaft accelerations versus corresponding air/fuel ratios may then be mapped as shown in map 402 in FIG. 4, for example.

For example, curve 404 shown in map 402 may be a curve fit to acceleration versus air/fuel ratio data (shown as boxes in 402) for a first example scenario where a series of rich, lean, and stoichiometric conditions are generated in a selected cylinder. Curve 404 may then be compared with an ideal torque curve 410 shown in map 412 in FIG. 4. By using the slope or shape of curve 404, a match point on ideal curve 410 may be obtained as described above with regard to action 214 in FIG. 2. In this example, the slope of curve 404 corresponds to the stoichiometric point on ideal curve 410 indicating that the selected cylinder does not have a significant air/fuel imbalance.

A second example scenario is illustrated with curve 406 in map 402. Curve 406 is an example curve fit to acceleration versus air/fuel ratio data (shown as circles in map 402) for a second example scenario where a series of rich, lean, and stoichiometric conditions are generated in a selected cylinder. In this example, curve 406 has a negative slope and when compared with ideal torque curve 410 in map 412, curve 406 corresponds to a lean point on the ideal curve indicating a lean imbalance in the selected cylinder.

Further, by comparing curve 406 with ideal curve 410, a deviation 414 may be determined. In this example deviation 414 corresponds to an amount or magnitude of lean shift in the cylinder. This amount of lean shift may then be used to apply a correction to the selected cylinder to mitigate the imbalance. For example since the selected cylinder is imbalanced in a lean direction, the amount of fuel injected into the selected cylinder may be increased to compensate for the imbalance.

A third example scenario is illustrated with curve 408 in map 402. Curve 408 is an example curve fit to acceleration versus air/fuel ratio data (shown as triangles in map 402) for a third example scenario where a series of rich, lean, and stoichiometric conditions are generated in a selected cylinder. In this example, curve 408 has a positive slope and when compared with ideal torque curve 410 in map 412, curve 408 corresponds to a rich point on the ideal curve indicating a rich imbalance in the selected cylinder.

As described above, by comparing curve 408 with ideal curve 410, a deviation 416 may be determined. In this example, deviation 416 corresponds to an amount of rich shift in the cylinder. This amount of rich shift may then be used to apply a correction to the selected cylinder to mitigate the imbalance. For example since the selected cylinder is imbalanced in a rich direction, the amount of fuel injected into the selected cylinder may be decreased to compensate for the imbalance.

As remarked above, crankshaft acceleration perturbations, such as those described above with regard to FIGS. 2 and 3, may also be used to identify the alcohol content of fuel used in an engine. FIG. 5 shows an example method 500 for detecting fuel conditions based on crankshaft acceleration and adjusting fuel injection to the engine accordingly.

In some examples, under certain conditions, one or more actions of method 500 may be performed in concert or in sequence with one or more actions of method 200. For example, during a first engine operating mode, method 200 may be used to detect air/fuel imbalances whereas during a second engine operating mode method 800 may be implemented.

At 502, method 500 includes determining if fuel detection conditions are met. For example, fuel detection conditions may be engine rotation speed dependent and/or may includes various parameters to reduce transient air/fuel effects, or various other conditions. As another example, fuel detection conditions may depend on a recent refueling event wherein a fuel with an unknown alcohol concentration has been added for use in the engine.

If fuel detection conditions are met at 502, method 500 proceeds to 504. At 504, method 500 includes determining if non-imbalance monitoring conditions are met. Namely, in some examples, estimating fuel alcohol content from crankshaft acceleration may not be performed during crankshaft accelerations used in monitoring for air/fuel imbalances.

If non-imbalance monitoring conditions are met at 504, method 500 proceeds to 506. At 506, method 500 includes selecting cylinders for modulation by crankshaft accelerations. Cylinders may be selected based on a variety of factors. For example, a cylinder which has been confirmed to have an air/fuel imbalance may be selected. As another example, a cylinder which has not been identified as having a potential air/fuel imbalance may be selected. Further, a plurality of cylinders may be selected or just one cylinder may be selected depending on sensor locations and engine operating conditions, for example.

At 508, method 500 includes modulating cylinder air/fuel ratio in selected cylinders at a selected magnitude and frequency across a range of air/fuel ratios. For example, a series of rich, lean, and stoichiometric conditions may be induced in the cylinder while keeping the engine at stoichiometry, as described above. Modulating cylinder air/fuel ratios in this way may generate crankshaft accelerations which may be monitored, e.g., by controller 12, for use in a torque mapping described below.

At 510, method 500 includes mapping torque imbalances due to crankshaft accelerations to air/fuel modulation to populate a torque curve. By performing these commanded in-cylinder lambda excursions on a given cylinder of sufficient magnitude around a closed-loop control target and observing the crankshaft acceleration difference in the powerstroke for that cylinder, the shape of a torque versus lambda deviation can be mapped.

At 512, method 500 includes estimating fuel alcohol concentration from the mapping of the torque curve. For example, the fuel alcohol content may be determined based on a slope of the mapping together with an air/fuel ratio reading from a sensor (e.g., sensor 126) to use as a reference point. In such an example, an increased fuel alcohol content may be identified in response to an increased slope of the mapping.

Figure 6:
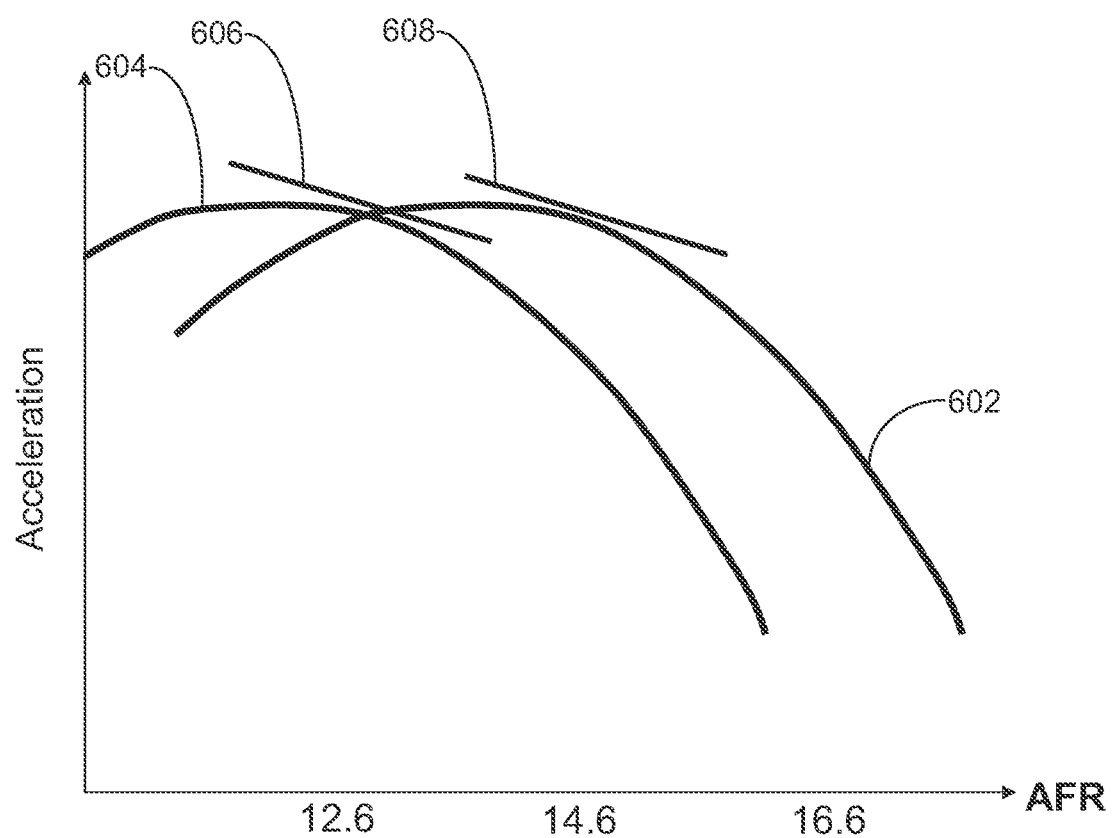
FIG. 6 shows an example torque versus air/fuel ratio curve for gasoline and an example torque versus air/fuel ratio curve for an ethanol/gasoline blend.

For example, FIG. 6 shows an example torque versus air/fuel ratio curve for gasoline at 602 and an example torque versus air/fuel ratio curve for an ethanol/gasoline blend at 604. FIG. 6 illustrates how a torque versus air/fuel ratio curve may shift with increasing alcohol content. In this example, a slope 606 is shown at stoichiometry on the torque versus air/fuel ratio curve 604 for a blend of ethanol and gasoline, and a slope 608 at stoichiometry on the torque versus air/fuel ratio curve 602 for and gasoline. In particular, FIG. 6 illustrates how stoichiometry of an unknown blend of fuel may be identified based on the slope of the torque versus air/fuel ratio curve. For example, oscillating an air/fuel ratio in a cylinder around 14.6 would give a first slope for gasoline and a second slope for an ethanol/gas blend, where the magnitude of the second slope is greater than the magnitude of the first slope.

As another example, the fuel alcohol content may be determined based on pattern matching with a torque versus open-loop lambda mapping. For example, by adding the crankshaft acceleration difference in the powerstroke for a cylinder to a known mean deviation of commanded lambda for all cylinders used to achieve a closed loop target, the ethanol content of fuel may be approximated by comparing the shape of the torque versus lambda deviation to the shape of the torque versus open loop lambda. In some examples, these two mappings may be combined into a single metric of correlation which may be used to determine alcohol content of the fuel. Additionally, in some examples, logic may be applied, e.g., via ASIC 109, to include first looking at an assumed open loop versus closed-loop air/fuel ratio and then initiating a second pattern based intrusive monitor to confirm and more accurately measure alcohol content of the fuel.

At 514, method 500 includes adjusting a desired air/fuel ratio setting in closed loop air/fuel control based on the identified fuel alcohol content. For example, fuel injection to the engine may be adjusted based on the identified alcohol content of the fuel. The fuel injection may be adjusted by controller 12 by increasing or decreasing an amount of fuel supplied to the engine, for example. By adjusting engine air/fuel ratios based on the fuel alcohol content, increased air/fuel control, reduced air/fuel imbalances, and reduced emissions may be achieved.

Figure 7:
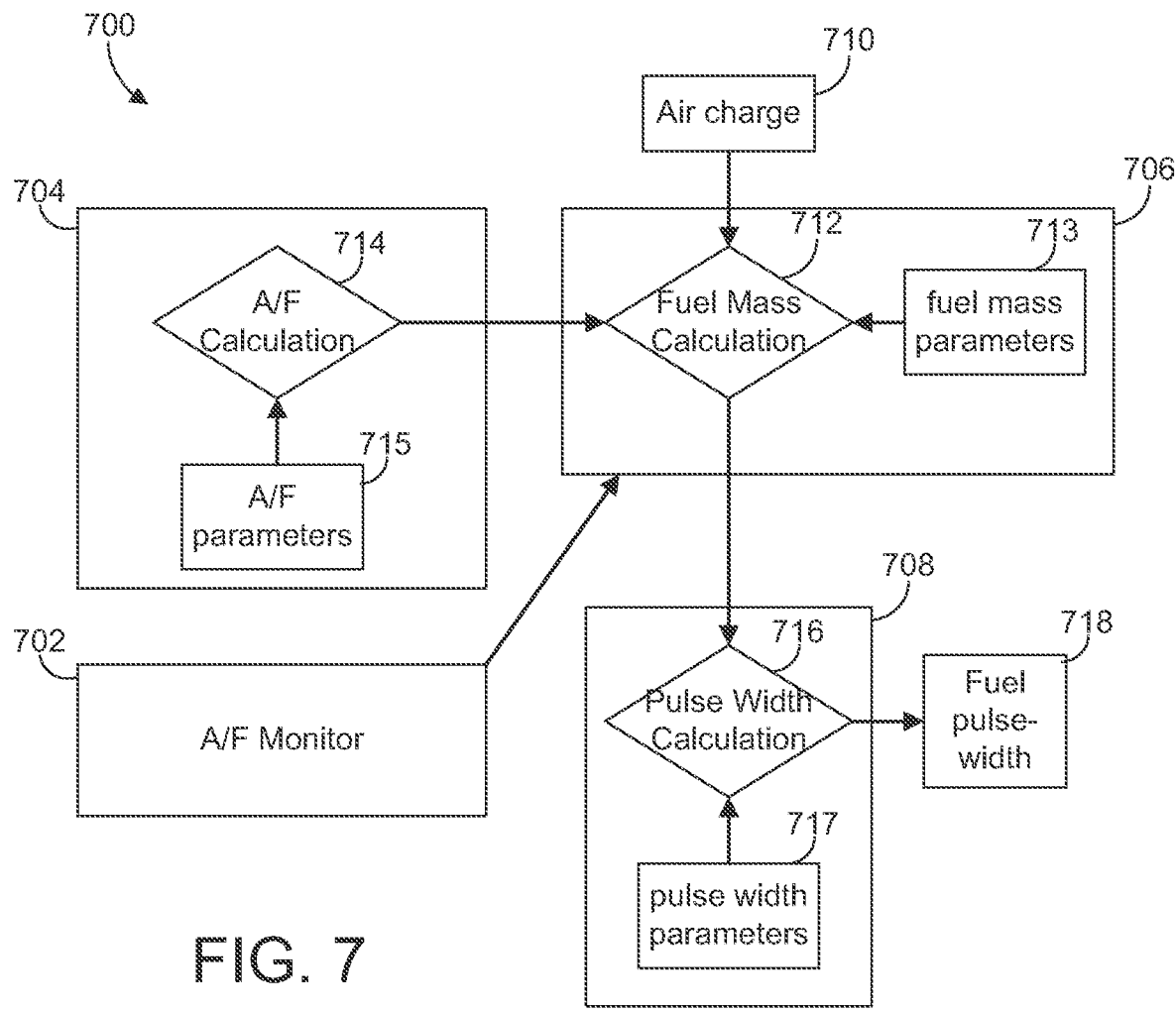
FIGS. 7-8 show example interfaces in accordance with the disclosure.

FIG. 7 shows an example interface 700 between an air/fuel imbalance monitor 702 and foreground fuel interfaces in accordance with the disclosure. The fuel interfaces shown in FIG. 7 include a lambda domain interface 704, a fuel mass domain interface 706, and a pulse width domain interface 708.

A cylinder air charge 710 is input into a mass fuel calculator 712 in the mass domain interface 706. The mass fuel calculator is configured to determine a mass of fuel to be injected into a cylinder based on a variety of parameters 713. For example, in determining the amount of fuel, the mass fuel calculator may depend on wall wetting, fuel from the evaporative emission system, fuel in oil, fuel in a reservoir, etc. In one example, the routine determines each of these parameters 713 based on operating conditions, for example, the routine may determine an amount of fuel entering the cylinder from the wall wetting model, an amount of fuel from the fuel vapor purging system, an amount of fuel contributed by the engine oil, fuel from the positive crankcase ventilation system (PCV), fuel re-ingested from the intake manifold that was pushed back from other cylinders (referred to as pushback fuel), etc.

Further, the mass fuel calculator interfaces with the lambda domain interface 704 to receive a fuel/air ratio as determined in lambda domain 704. Lambda domain 704 determines an air/fuel ratio via an air/fuel ratio calculator 714 which determines an air/fuel ratio based on a variety of parameters 715 such as lost fuel, setpoints, and an open versus closed loop feed. In some examples, the routine determines parameters 715 based on operating conditions, for example, the routine may determine an amount of lost fuel based on a lost fuel model and/or from air/fuel sensor readings, a lambda setpoint value may be based on a predetermined or desired engine power enrichment and/or engine component protection parameters, for example.

Mass fuel calculator 712 also interfaces with imbalance monitor 702 to receive mass multipliers and base fuel multipliers to implement air/fuel imbalance patterns to induce crankshaft accelerations in the engine cylinders based on predetermined patterns as described above. For example, a set of imbalance patterns may be sequentially applied to the mass fuel calculation to implement slight air/fuel imbalances in the cylinders for the monitoring routines described above.

The fuel mass is then output to the pulse width domain 708 which includes a pulse width calculator 716 to calculate a pulse-width for injection into a cylinder based on a variety of parameters 717. For example, parameters 717 may be based on engine operating conditions such as a desired injection slope and offset, an injection mode, smoke limits, etc. A fuel pulse-width 718 may then be output to the engine.

Figure 8:
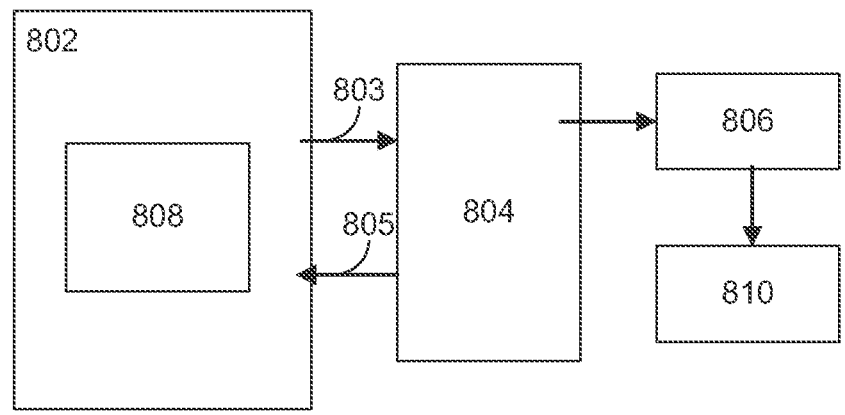

FIG. 8 illustrates interfaces between the air fuel imbalance logic 802 and foreground fuel logic 804. To run the air fuel imbalance test as described above, at 803 the system requests permission from the foreground fuel logic 804. If permission is granted at 805, the system applies a set of multipliers 806 to a base fuel term based on a set of patterns 808. If the entry conditions are disabled during a set of continuous patterns 808 the system aborts and returns to the beginning of patterns that have not been completed. The final result of the logic is calculated acceleration terms 810 for a given cylinder and pattern index corresponding to patterns 808.

Figure 9:
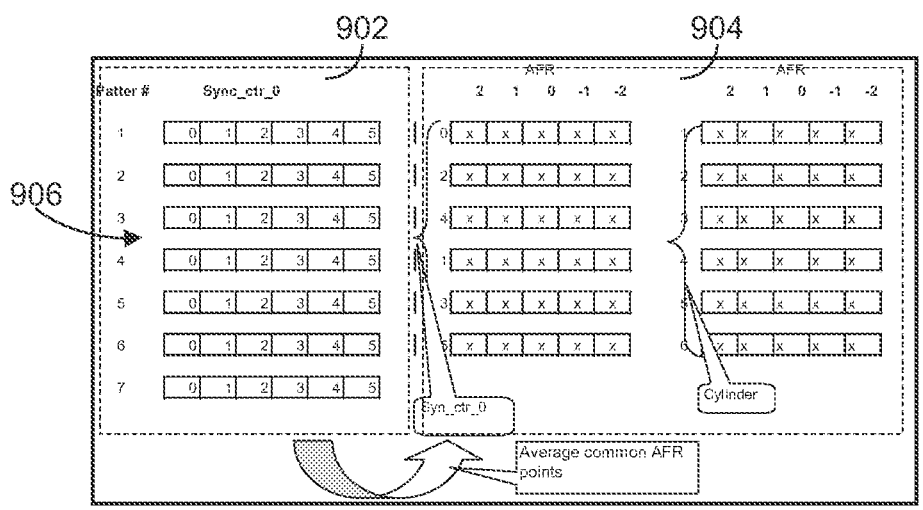
FIG. 9 shows an example transition from a foreground combustion event counter based table to a cylinder bank air/fuel ratio based table.

FIG. 9 shows an example transition from a foreground combustion event counter based table 902 (e.g., the square wave generated from the crankshaft speed sensor 118) to a cylinder bank air/fuel ratio based table 904. The figure illustrates the interfaces between the applications of patterns 906 and a so called "binning process." The pattern design is "orthogonal" to maintain the entire bank at stoichiometry through pattern repetition as described above. Thus, the system correlates cylinder firing order, pattern index, and air fuel binning cells to store the repeated pattern calculation. For example, FIG. 9 illustrates a strategy where the cylinder index 0 is correlated to cylinder 6 and index 1 through 5 to cylinder 1 through 5.

It will be appreciated that the configurations and routines disclosed herein are exemplary in nature, and that these specific embodiments are not to be considered in a limiting sense, because numerous variations are possible.

The subject matter of the present disclosure includes all novel and nonobvious combinations and subcombinations of the various systems and configurations, and other features, functions, and/or properties disclosed herein. For example, once the pressure based measurement becomes available, it may be possible to adaptively update the model based on a comparison of the incremental soot load previously obtained while the pressure based measurement was unavailable.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine comprising:
    injecting fuel to generate a series of rich, lean, and stoichiometric conditions in an engine cylinder;
    identifying, via an electronic controller, an air/fuel imbalance in the cylinder based on crankshaft accelerations generated by the series of rich, lean, and stoichiometric conditions and sensed by the controller; while injecting fuel to generate the series of rich, lean, and stoichiometric conditions, keeping the engine at stoichiometry by injecting fuel to generate another series of lean, rich, and stoichiometric conditions in another cylinder, the identifying based on a slope or shape of the sensed crankshaft accelerations mapped by the controller versus air/fuel ratios corresponding to the series of rich, lean, and stoichiometric conditions; and
    adjusting, via the controller, an amount of fuel supplied to the cylinder identified as imbalanced.

2. The method of claim 1, wherein the series of rich, lean, and stoichiometric conditions in the cylinder are induced in the cylinder based on predetermined patterns, the method further comprising selecting a cylinder confirmed to have an identified imbalance, and further identifying a fuel alcohol content by modulating air/fuel ratio to the selected cylinder.

3. The method of claim 1, wherein the series of rich, lean, and stoichiometric conditions in the cylinder are random air/fuel variations in the cylinder.

4. The method of claim 1, further comprising identifying a magnitude and a direction of an air/fuel imbalance in the identified cylinder based on the slope or shape.

5. The method of claim 4, further comprising applying an air/fuel correction to the identified cylinder based on the identified magnitude and direction of an air/fuel imbalance in the identified cylinder.

6. The method of claim 5, further comprising indicating a non-fuel related degradation of the identified cylinder if an imbalance is identified in the cylinder after applying the air/fuel correction.

7. The method of claim 5, further comprising indicating degradation of the identified cylinder if the magnitude is above a threshold value.

8. A method for controlling an engine with an electronic engine controller, comprising:
    during engine operation:
        generating crankshaft accelerations by modulating an air/fuel ratio in a selected cylinder across a range of air/fuel ratios while keeping the engine at stoichiometry via the electronic engine controller signaling fuel injectors of the engine;
        mapping the crankshaft accelerations versus air/fuel ratios corresponding to the modulated air/fuel ratio conditions in the selected cylinder via the electronic engine controller; and
        identifying via the electronic engine controller a potential air/fuel imbalance in the selected cylinder based on a slope or shape of the mapping of the crankshaft accelerations versus the modulated air/fuel ratios compared with an ideal curve, an induced series of rich, lean, and stoichiometric conditions in the selected cylinder compensated by a concurrent series of lean, rich, and stoichiometric conditions in another cylinder.

9. The method of claim 8, wherein the air/fuel ratio is modulated around stoichiometry.

10. The method of claim 8, wherein the air/fuel ratio is modulated by inducing the series of rich, lean, and stoichiometric conditions in the selected cylinder.

11. The method of claim 8, further comprising identifying a magnitude and a direction of the air/fuel imbalance in the selected cylinder based on the slope or shape.

12. The method of claim 11, further comprising applying an air/fuel correction to the selected cylinder based on the identified magnitude and direction of the air/fuel imbalance in the selected cylinder, wherein the ideal curve is an ideal torque curve.

13. The method of claim 12, further comprising indicating a non-fuel related degradation of the selected cylinder if an imbalance is identified in the cylinder after applying the air/fuel correction.

14. The method of claim 12, further comprising indicating degradation of the selected cylinder if the magnitude is above a threshold value.

15. A system for an engine comprising:
fuel injectors; and
a controller communicating with the fuel injectors and having instructions stored in memory and configured to:
identify a cylinder with a potential air/fuel imbalance based on crankshaft accelerations generated by a series of rich, lean, and stoichiometric conditions in the cylinder, while keeping the engine at stoichiometry, wherein the identifying is based on a slope or shape of a mapping of sensed crankshaft accelerations versus air/fuel ratios corresponding to the series of rich, lean, and stoichiometric conditions as compared with an ideal torque curve versus air/fuel ratios corresponding to the series of rich, lean, and stoichiometric conditions; and
supply an adjusted fuel amount based on an identified imbalance.

16. The system of claim 15, wherein the series of rich, lean, and stoichiometric conditions in the cylinder are compensated by a series of lean, rich, and stoichiometric conditions, respectively, in another cylinder.

17. The method of claim 12, wherein the mapping of the crankshaft accelerations versus air/fuel ratios further includes calculating a curve fit to the corresponding modulated air/fuel ratio conditions in the selected cylinder.

18. The method of claim 17, wherein normalized torque accelerations are used to populate the mapping of the crankshaft accelerations versus air/fuel ratios.

19. The method of claim 17, further comprising determining a correction corresponding to an amount and direction of a shift in air/fuel ratio from a stoichiometric point for the curve fit to the air/fuel ratio point at the stoichiometric point on the ideal torque curve.

20. The method of claim 19, further comprising adjusting fuel injection with an amount and sign of fuel correction based on the amount and direction of the shift, wherein the curve fit is stored in memory of the electronic engine controller.

21. The method of claim 8, wherein the potential air/fuel ratio imbalance is determined from the mapping during a first engine operating condition including imbalance monitoring, the method further comprising during a second engine operating condition including non-imbalance monitoring.

22. The method of claim 1, further comprising:
selecting a cylinder confirmed to have an identified imbalance;
modulating cylinder air/fuel ratio in the selected cylinder including with another series of rich, lean, and stoichiometric conditions; and
identifying fuel alcohol content based on mapped crankshaft accelerations corresponding to the another series of rich, lean, and stoichiometric conditions and an air/fuel ratio reading from a sensor as a reference point.

23. The method of claim 22, wherein an increased fuel alcohol content is identified in response to an increased slope of the mapping, the method further comprising adjusting an air/fuel ratio setting in closed loop control based on the identified fuel alcohol content.

* * * * *